(12) United States Patent
Jin et al.

(10) Patent No.: US 7,257,179 B2
(45) Date of Patent: Aug. 14, 2007

(54) METHOD AND APPARATUS FOR FREQUENCY TRACKING IN A SPACE TIME TRANSMIT DIVERSITY RECEIVER

(75) Inventors: Xin Jin, Nepean (CA); Runbo Fu, Kanata (CA); Jorgen S. Nielsen, Calgary (CA)

(73) Assignee: Research In Motion Limited, Waterloo (CA)

( * ) Notice: Subject to any disclaimer, the term of this patent is extended or adjusted under 35 U.S.C. 154(b) by 745 days.

(21) Appl. No.: 10/091,772

(22) Filed: Mar. 6, 2002

(65) Prior Publication Data

US 2002/0154715 A1 Oct. 24, 2002

Related U.S. Application Data

(60) Provisional application No. 60/273,708, filed on Mar. 6, 2001.

(51) Int. Cl.
*H04B 7/10* (2006.01)
*H04L 1/02* (2006.01)

(52) U.S. Cl. ............... 375/347; 375/348; 375/349; 375/350; 370/335; 370/336

(58) Field of Classification Search ............ 375/347, 375/348, 349, 350, 351, 259, 263, 267, 261, 375/130, 146, 147, 148; 370/342, 203, 335, 370/204, 208
See application file for complete search history.

(56) References Cited

U.S. PATENT DOCUMENTS

| | | | |
|---|---|---|---|
| 5,241,562 A * | 8/1993 | Partyka et al. | 375/142 |
| 6,650,694 B1 * | 11/2003 | Brown et al. | 375/150 |
| 6,728,302 B1 * | 4/2004 | Dabak et al. | 375/148 |
| 6,748,024 B2 * | 6/2004 | Kuchi et al. | 375/299 |
| 6,754,253 B2 * | 6/2004 | Guey | 375/148 |
| 6,754,286 B2 * | 6/2004 | Hottinen et al. | 375/299 |
| 6,775,260 B1 * | 8/2004 | Dabak et al. | 370/342 |
| 6,985,432 B1 * | 1/2006 | Hadad | 370/203 |
| 2002/0084933 A1 * | 7/2002 | Krasner | 342/357.01 |
| 2005/0058216 A9 * | 3/2005 | Nafie et al. | 375/267 |

* cited by examiner

*Primary Examiner*—Mohammed Ghayour
*Assistant Examiner*—Qutub Ghulamali
(74) *Attorney, Agent, or Firm*—Jones Day; Krishna K. Pathiyal; Robert C. Liang

(57) ABSTRACT

A system and method for obtaining a frequency error estimate representing the difference between a reference frequency and the frequency of a space-time transmit diversity signal is disclosed herein. The method includes taking the correlation of total sums, comprised of partial sums taken in defined first and second intervals, to represent the frequency error as the imaginary component of the correlation function.

21 Claims, 9 Drawing Sheets

STTD encoded channel bits for antenna 1 and antenna 2.

METHOD AND APPARATUS FOR FREQUENCY TRACKING IN A SPACE TIME TRANSMIT DIVERSITY RECEIVER

CROSS-REFERENCE TO RELATED APPLICATION

This application claims priority from and is related to the following prior application: "METHOD AND APPARATUS FOR FREQUENCY TRACKING IN A SPACE TIME TRANSMIT DIVERSITY RECEIVER", U.S. Provisional Application No. 60/273,708, filed Mar. 6, 2001. This prior application, including the entire written description and drawing figures, is hereby incorporated into the present application by reference.

BACKGROUND

1. Field of the Invention

This invention relates to the art of receiving a Space Time Transmit Diversity (STTD) signal. In particular, this invention relates to frequency tracking of an STTD signal. The invention finds application in a closed-loop automatic frequency control in wireless user equipment. The invention is particularly well suited for use in Personal Digital Assistants, mobile communication devices, cellular phones, and wireless two-way e-mail communication devices (collectively referred to herein as "wireless devices"). The invention provides utility, however, in any device that receives an STTD signal.

2. Description of the Related Art

Space Time Transmit Diversity (STTD) reception is often mandatory for user equipment (UE), such as mobile communication devices, to operate in a standard fashion with various wireless communication radio network sub-systems (RNS), such as base stations. For example, in the 3rd Generation Partnership Project (3GPP) standard document No. 3GTS 25.211 V3.1.1 (1999-12), it is clearly indicated that STTD reception is mandatory for UE.

The concept of STTD transmission is known to those of skill in the art and involves the use of two transmit antennas at the RNS employing a space time block coding, such as the example illustrated in the block diagram of an STTD encoder of FIG. 1.

Although STTD transmission at an RNS is meant to be beneficial to reception at the UE, frequency tracking at the UE is complicated by STTD transmission.

Typically, in non-STTD systems, UE tracks an RNS pilot signal in order to control a local reference oscillator. The pilot signal is usually specifically designed in order to facilitate determining a frequency offset.

However, when the received signal from the base station is an STTD signal, detection of the frequency offset from the received signal is more difficult. FIG. 2 illustrates a typical pilot modulation pattern transmitted by STTD. The symbol A is a complex number with real and imaginary parts. In this particular case, the symbols from antenna 1 are always +A, while the symbols from antenna 2 are alternatively +A and −A with pattern shown. One problem with this pattern is that the two signal components can interfere with each other at the UE. Although not explicitly illustrated, one of skill in the art will appreciate that other patterns exist which present the same problem. Considering typical propagation conditions between RNS and UE, conventional methods for frequency tracking do not have sufficient performance to enable reliable frequency tracking. An alternative to frequency tracking is to rely on highly stable frequency reference source in the UE. However, this alternative is neither cost effective nor is it optimal from the receiver performance perspective.

There is a need for a method and apparatus for detecting frequency error between a frequency reference and a received STTD signal at UE. There is a further need for a method and apparatus that controls the frequency reference by tracking a received STTD signal at UE.

SUMMARY

It is an object of the present invention to obviate or mitigate at least one disadvantage of previous frequency discriminators for STTD signals.

It is a particular object of the present invention to provide a method and apparatus for detecting frequency error between a frequency reference and a received STTD signal at UE. It is a further object of the present invention to provide a method and apparatus that controls the frequency reference by tracking a received STTD signal at UE.

This invention uses the statistical properties of symbols transmitted in an STTD signal to efficiently remove the interference introduced between the two STTD antennas at the UE. Removing the interference provides a wide range for frequency error detection, which increases the control range, relaxes the requirement for frequency reference accuracy, and eventually reduces UE cost.

In a first aspect, the present invention provides a method of obtaining a frequency error estimate of the difference between a reference frequency and the frequency of a space time transmit diversity signal from first and second received sequences of symbols, transmitted respectively by first and second antennae, where each sequence has two sets of first and second intervals, such that the contents of the second interval of the second received sequence are the additive inverse of the contents of the first interval of the second received sequence, the method comprising the steps of: receiving the first and second sequences of symbols; calculating two sets of first and second partial sums as the sum of the contents of the first and second intervals, respectively, for each set; calculating total sum functions for the first and second sets by summing the first and second partial sums for each set; calculating a correlation function based on the total sum functions for the first and second sets; and extracting the frequency error estimate from the correlation function.

In an embodiment of the first aspect of the present invention the correlation function is calculated as a time average of the product of the first total sum function and the conjugate of the second total sum function. In other embodiments the received symbols are represented by complex numbers, and the step of extracting includes isolating the imaginary part of the correlation function as the frequency error estimate.

The first and second intervals in each set can be adjacent, or they can be interleaved with the first and second intervals of the other set. The intervals can also be half or whole symbols in length.

In one embodiment, the step of calculating the total sum includes multiplying the second partial sum for each set by −1, either in addition to, or as a replacement of the original total sum step. In a further embodiment the correlation of the two total sums are added to create a third correlation function from which the error can be extracted. In yet another embodiment there is included the step of multiplying the frequency error estimate by the average of a signal-to-noise-ratio of the received sequences.

In another embodiment a method of controlling the reference frequency to match the frequency of the STTD signal is also provided, using the above described steps, and further comprising the step of altering the reference frequency based on the frequency error estimate to minimize the difference between the reference frequency and the frequency of the space time transmit diversity signal.

In a second aspect of the present invention there is provided an apparatus having a frequency discriminator for obtaining a frequency error estimate of the difference between a reference frequency and the frequency of a space time transmit diversity signal from first and second received sequences transmitted respectively by first and second antennae, and received by a receiving antenna, where each sequence has two sets of first and second intervals, of equal length, such that the contents of the second interval of the second received sequence are the additive inverse of the contents of the first interval of the second received sequence, the frequency discriminator comprising: a memory, operatively attached to the receiving antenna for storing the contents of the first and second sequences; interval defining means, operatively attached to the memory to receive the first and second sequences of symbols, for dividing the received sequences into sets of first and second intervals; partial sum adding means, operatively attached to the interval defining means to receive the contents of first and second sequences during the two sets of first and second intervals, for calculating two sets of first and second partial sums as the sum of the contents of the first and second intervals respectively for each set; total sum adding means, operatively attached to the partial sum adding means to receive the two sets of first and second partial sums, the total sum adding means for calculating total sum functions for the first and second sets representing the sum of the first and second partial sums for each set; conjugation means, operatively attached to the total sum adding means to receive the total sum of the second set of partial sums, for calculating the conjugate of the received total sum; multiplier means, operatively attached to the conjugation means and total sum adding means to receive the total sums for multiplying the received total sums thereby providing a correlation function; and a frequency error estimator, operatively attached to the multiplier means to receive the correlation function, for extracting the frequency error from the correlation function.

In one embodiment the interval defining means is a sampler and additionally there is a selective sampler connecting the partial sum adding means and the total sum adding means for selectively providing the total sum adding means with the partial sum adding means. In other embodiments the scaling means include means to dividing each total sum by its magnitude, and are ideal scalers. In another embodiment there is a second scaling means, connecting the multiplier means to the diversity combining means, to receive the multiplied total sums, for scaling the received multiplied total sums, and providing the scaled multiplied total sums to the diversity combining means.

In other embodiments the frequency error estimator includes a splitter for separating the real and imaginary component of the correlation function to provide the imaginary component of the correlation function as the frequency error.

The interval defining means include the partial sum adding means with symbols from adjacent first and second intervals in the same set, or alternatively with symbols from interleaved sets of first and second intervals. In each of these cases intervals can be one symbol in length, or they can be a half symbol in length.

In other embodiments, the above frequency discriminator includes a negator, that connects the partial sum adding means to the total sum adding means, for multiplying the second partial sum of each set by −1, and provides the negated second partial sum to the total sum adding means.

In another embodiment, the frequency error is calculated using a negator, connecting the partial sum adding means to a second total sum adding means, for receiving the second partial sum of each set from the partial sum adding means, for negating the second partial sum of each set my multiplying the second partial sum by −1 and a second total sum adding means, operatively attached to the partial sum adding means to receive the first partial sum of each set and to the negator for receiving the negated second partial sum for each set, for calculating second total sum functions for the first and second sets representing the sum of the first partial sum and the negated second partial sum of each set, and for providing the conjugation means with the second total sum of the second set for conjugation. In another embodiment the frequency error estimator is operatively connected to the diversity combining means to receive two correlation functions corresponding to the output of the first and second total sum adding means, for proving the sum of the two correlation functions as the frequency error.

Further embodiments of this aspect of the invention change the reference frequency to minimize the frequency error using a loop filter, operatively attached to the frequency discriminator to receive the frequency error, for generating an oscillator control signal based on the frequency error to minimize the difference between the reference frequency and the frequency of the space time transmit diversity signal and a controlled oscillator, operatively attached to the loop filter to receive the oscillator control signal, for generating the reference frequency based on the oscillator control signal. In further embodiments the controlled oscillator is a numerically controlled oscillator or a voltage-controlled oscillator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for determining the frequency error between a reference frequency and the frequency of an STTD signal. Further embodiments of the invention provide a method and system for minimizing the frequency error.

Due to the limited frequency accuracy of the frequency reference typically used in UE, closed-loop automatic frequency control (AFC) is desired.

Figure 1:
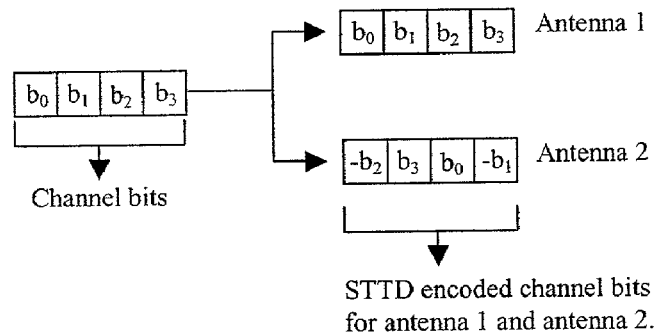
FIG. 1 is a prior art block diagram of an STTD encoder.
Figure 2:
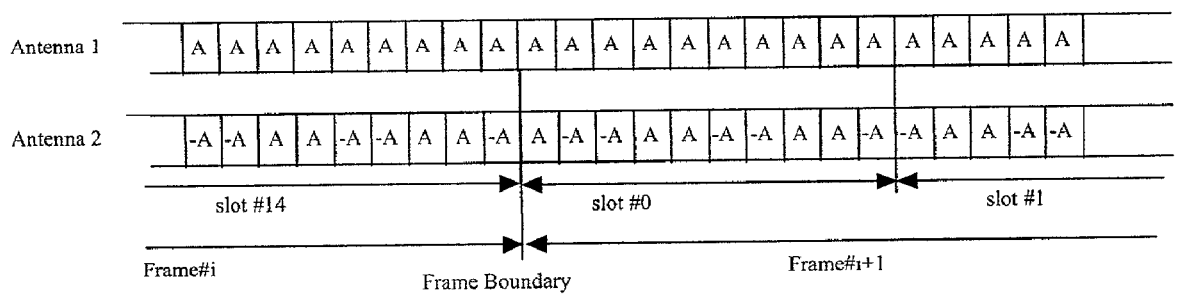
FIG. 2 is a prior art modulation pattern for an STTD signal.
Figure 3:
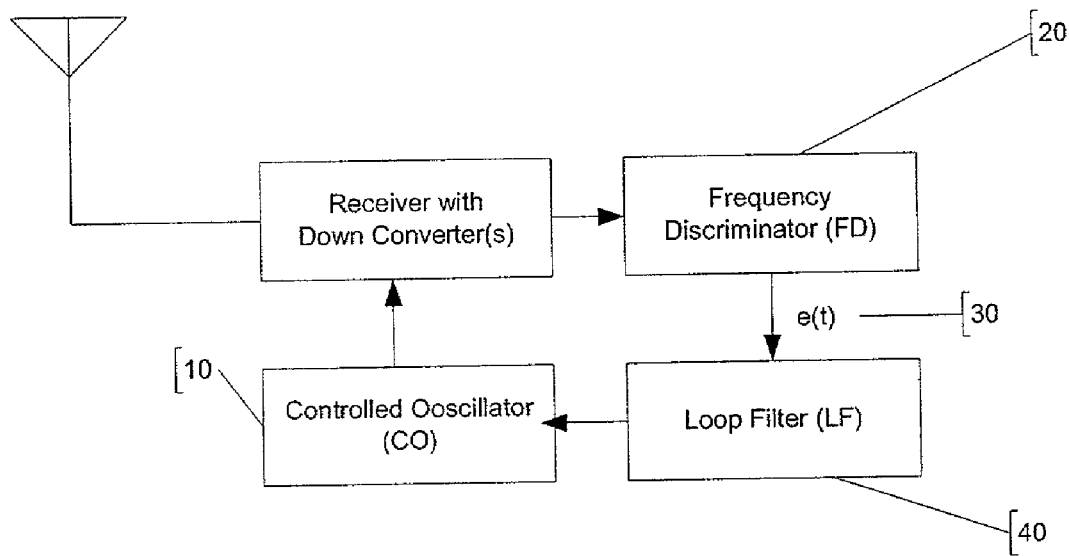
FIG. 3 is a block diagram that illustrates an AFC at UE.

FIG. 3 illustrates a block diagram of an AFC loop. The reference frequency is a generated by a controlled oscillator (CO) 10, such as a voltage or numerically controlled oscillator. The frequency discriminator (FD) 20 detects the magnitude and sign of a frequency error that the reference frequency may have with respect to a received signal. This frequency error is represented as error signal, e(t), 30 and is based on the frequency offset between the frequency reference and the received signal. The frequency error is then filtered by loop filter (LF) 40 to produce a correction signal applied to the CO to compensate for the error. In the receiver, after despreading the channel, the component received by antenna 1 is typically a phase-shifted stream of A's. The component received by antenna 2 is an independently phase shifted version of a stream of a "+A −A" pattern. If the frequency error is non-zero, the symbols received by antenna 1 and antenna 2 are statistically frequency shifted, i.e. a rotation in one direction on a complex plane. This frequency rotation can be detected by a correlation of the samples with time difference τ.

A first embodiment of a method and apparatus for frequency discrimination will be described in reference to FIGS. 4-6.

Figure 4:
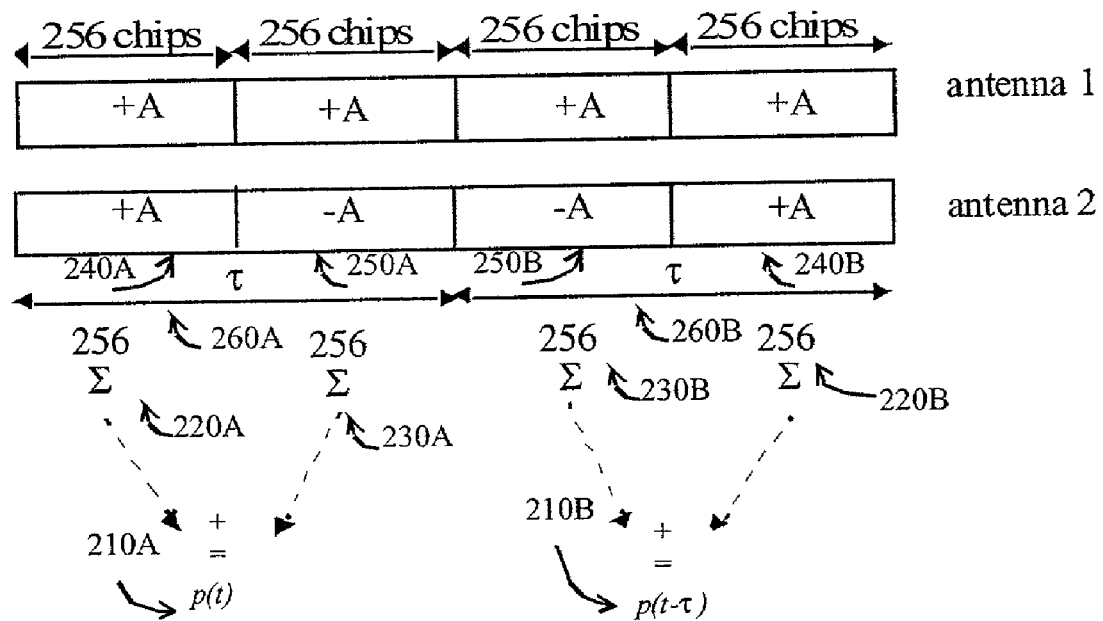
FIG. 4 is a block diagram that illustrates one embodiment of the method of operating the FD in an AFC at UE.

In reference to FIG. 4, one embodiment of a method of frequency discrimination to produce a frequency error is illustrated. A first and second sequence of symbols, representing the STTD signal, is received, and a first and second intervals are defined in the stream. The second interval 250 is defined using the properties of the second sequence, which corresponds to the message transmitted by antenna 2. The second interval 250 is defined as the interval where the symbols received are the same in magnitude as the symbols received in the first interval 240, but differ in their sign. A first partial sum 220A is taken as the sum of the symbols in the two sequences during the first interval 240A, and a second partial sum 230A is taken as the sum of the symbols in the two sequences during the second interval 250A. Upon calculating the partial sums, a total sum, referred to as p(t) 210A, is calculated by adding the two partial sums. A second total sum, also referred to as a delayed signal, is calculated in the same manner during a second interval, and is represented by p(t−τ) 210B, where the time difference between the sets of intervals is τ 260. All references in FIG. 4 referring to the second set of intervals are denoted using the same numerals as those for the first set, but are appended by the letter 'B' instead of 'A'.

This method of computing the total sum 210 allows the properties of the antenna 2 sequence to statistically cancel the interference that the antenna 2 signal would have had on the antenna 1 signal.

As mentioned earlier, the delayed signal p(t−τ) 210B is calculated in a manner analogous to signal p(t) 210A at one time period τ 260B prior to time t. Note that FIG. 4 illustrates the invention by way of example only. As such, in the case of delayed signal p(t−τ) 210B the second interval 230B occurs chronologically after the first interval 220B, whereas in the case of signal p(t) 210A, the second interval 230A occurs chronologically before the first interval 220A. A person skilled in the art can appreciate that the precise number or order of intervals can vary, as it is dependent on the actual antenna 1 and antenna 2 symbol sequences used, and that the invention can readily be adapted to many such symbol sequences, although not expressly shown in the drawings.

After obtaining p(t) and p(t−τ), a correlation of the two functions is taken. In a presently preferred embodiment the correlation is calculated by taking an average over time of $p(t)p^*(t-\tau)$, where $p^*(t-\tau)$ is the conjugate of $p(t-\tau)$ as will be understood by one of skill in the art. One of skill in the art will readily appreciated that the frequency error can be calculated in a number of ways, and that a presently preferred embodiment is to take the imaginary component of the complex number representation of the correlation.

Figure 5:
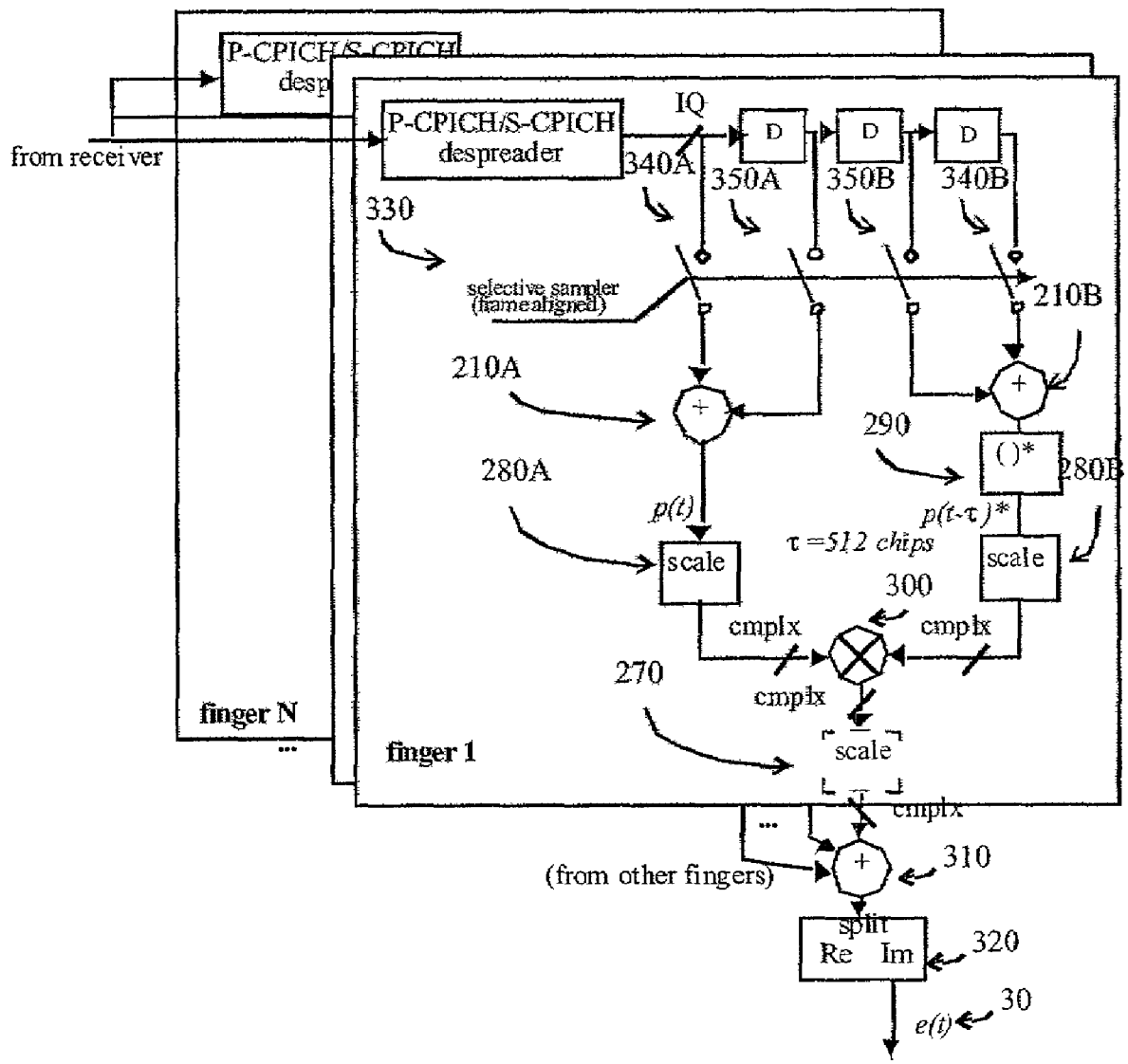
FIG. 5 is a block diagram that illustrates one embodiment of the FD apparatus operated on by the method of FIG. 4.

Referring to FIG. 5, a multi-finger apparatus 500 that embodies FD 20 of FIG. 3, employing the above method, can be constructed to provide the frequency error. The multi-finger structure 500 provides time diversity by having each finger 510 provide a partial correlation which are then combined by an adder 310 which averages the partial correlations, each of which is scaled 270, thereby providing diversity combining means. The operation of a single finger 510 will be described next.

The received symbols from the two sequences will be stored in a memory 205, and will be divided into first and second intervals by an interval defining means. A set of adders, for instance found in despreader 207, serving as a partial sum adding means, will add the symbols in each of the first and second intervals to provide first and second partial sums. The associated first (selectively available at tap 340A) and second (selectively available at tap 350A) partial sums will then be added together to produce a total sum, the output of adder 210A. This can be in parallel, or in series with the calculation of the time delayed partial sums (selectively at tap 350B and 340B respectively), which can be expressed as the partial sums of a second set of intervals. The time delayed total sum, the output of adder 210B, is provided to a conjugator 290, which provides the conjugate of the time delayed total sum. The first total sum, and the time delayed total sum are then scaled by scalers 280A and 280B, which are preferably ideal or exact scalers, and are then multiplied to each other by combiner 300. Scale block 270, to scale the resulting product of the multiplication, is not needed if the scalers 280A and 280B are ideal magnitude or exact normalizers. In a presently preferred embodiment the scale function is defined as $$scale(z) = \frac{z}{|z|}.$$

The selective sampler 330 can be designed to sample at some or all the intervals at which the antenna 2 component in the delay line have opposite sign in the first 340A and second 350A taps, and opposite sign in the third 350B and fourth 340B taps. Thus selective sampler 330 only provides symbols to the adders if there are identified first and second intervals, but the selective sampler can be designed to not provide all such instances.

Figure 6:
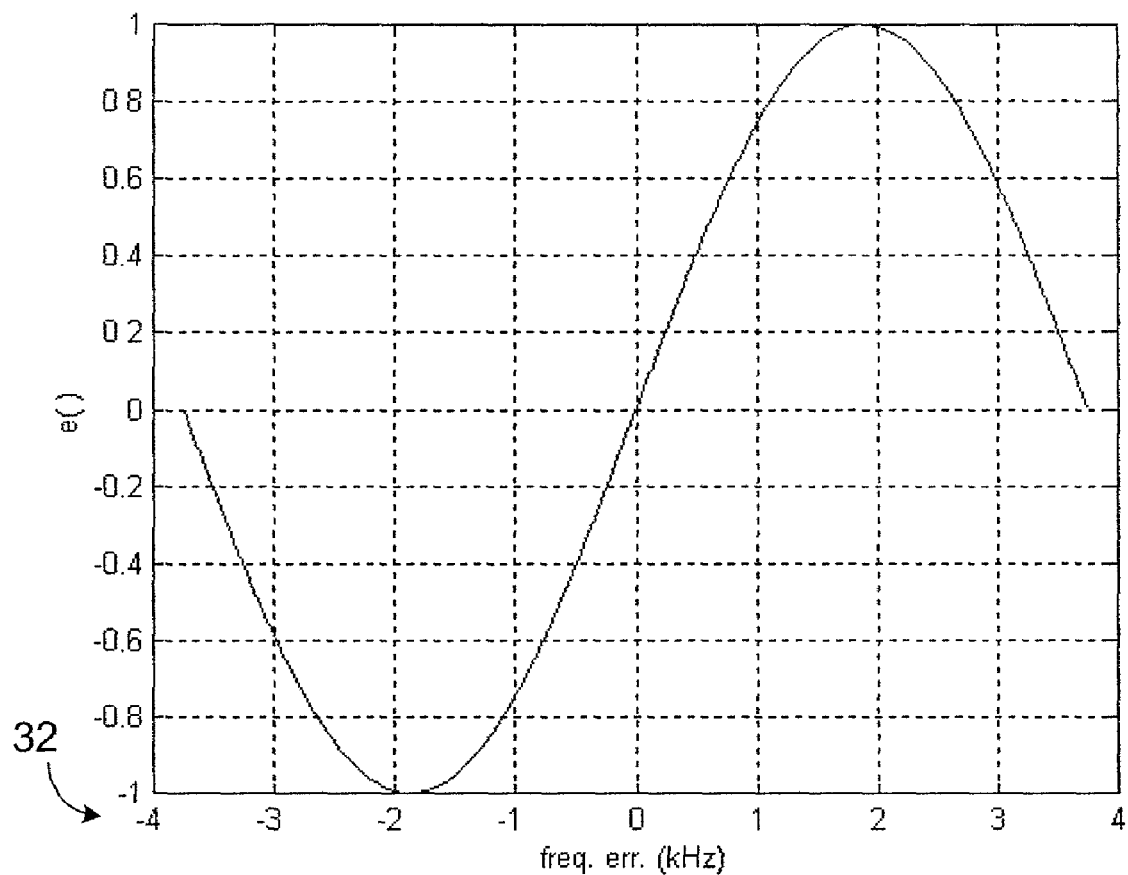
FIG. 6 illustrates an S-curve for the error signal provided by the method and apparatus of FIGS. 4 and 5.

When ideal scalers are used for the second 280A and third 280B "scale" blocks, the detector S-function, an embodiment of which is illustrated in FIG. 6 having chip rate of 3.84 Mcps is defined as:

$$e(t) = \operatorname{Im}\left(\frac{p(t) \cdot p(t-\tau)^*}{|p(t)| \cdot |p(t-\tau)|}\right) = \sin(\angle[p(t) \cdot p(t-\tau)^*]) = \sin(2\pi\Delta f\tau).$$

Referring to FIG. 6, the control range 32, illustrated by the range of the S-function curve, indicates that a frequency error detection range of less than 8 kHz is provided.

Figure 7:
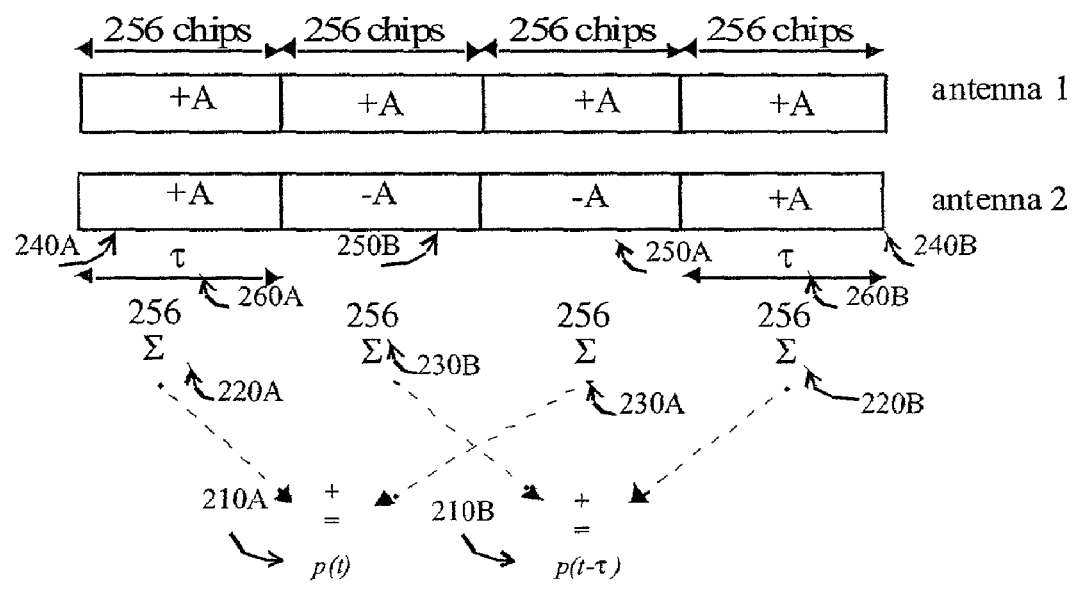
FIG. 7 is a block diagram that illustrates one embodiment of the method of operating the FD in an AFC at UE.

To increase the control range, a second embodiment of the method and apparatus is provided and will be described in reference to FIGS. 7-9. The block diagram of FIG. 7 illustrates a second embodiment of the method. This second embodiment changes the correlator by alternating the tap order thereby increasing the control range. The signal p(t) 210A is provided by the total sum of two partial sums, a first partial sum 220A and a second partial sum 230A. The first partial sum 220A is the sum of the symbols in first interval 240A, while the second partial sum 230A is the sum of the symbols in second interval 250A. The delay between signal p(t) 210A and p(t–τ) 210B is τ 260, which is half the value of the corresponding delay 260 in FIG. 4. This shorter delay is due to the interleaving of the intervals of the two sets. The interleaving of the intervals is done such that the first interval of one set is adjacent to the first interval of the opposite set, and the second intervals of the two sets are adjacent to each other, resulting in a pattern of first interval of the first set, second interval of the second set, second interval of the first set, and first interval of the second set. The method remains the same, save for the interleaving of the intervals.

Figure 8:
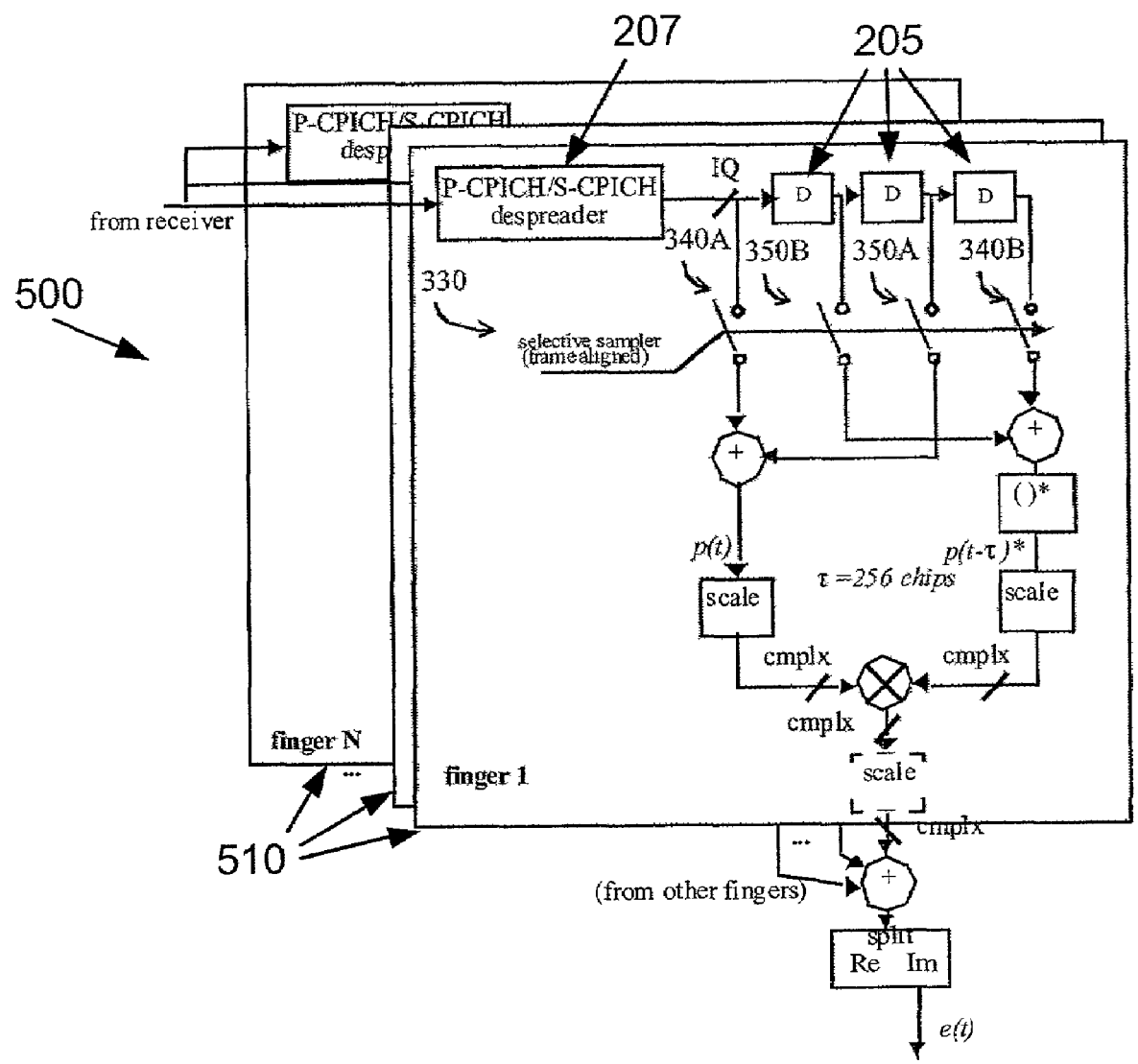
FIG. 8 is a block diagram that illustrates one embodiment of the FD apparatus operated on by the method of FIG. 7.
Figure 9:
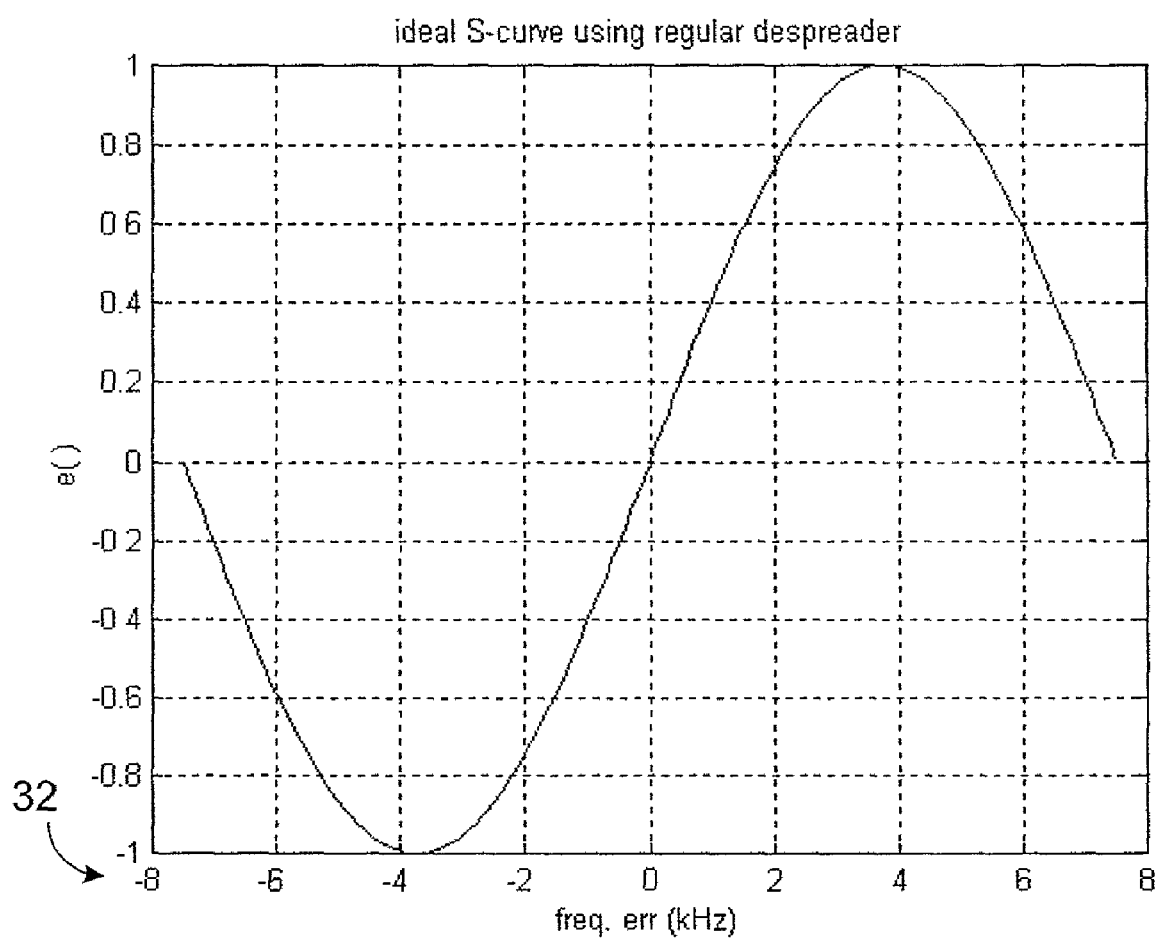
FIG. 9 illustrates an S-curve for the error signal provided by the method and apparatus of FIGS. 7 and 8.

The corresponding system to this method is illustrated in the apparatus of FIG. 8. The inputs of the adders of the total sum adding means allow the reorganization of the intervals as described in the method. The selective sampler 330 samples only at intervals at which the even taps (and odd taps) have opposite sign in the antenna 2 component, to ensure that the adders are provided only with symbols corresponding to first and second intervals. The selective sampler 330 can either sample during all such intervals, or only sample at some of such intervals. The S-function of this embodiment is illustrated in FIG. 9, which shows that the control range 32 has been doubled in this second embodiment and indicates that a frequency error detection range of less than 16 kHz is provided.

Figure 10:
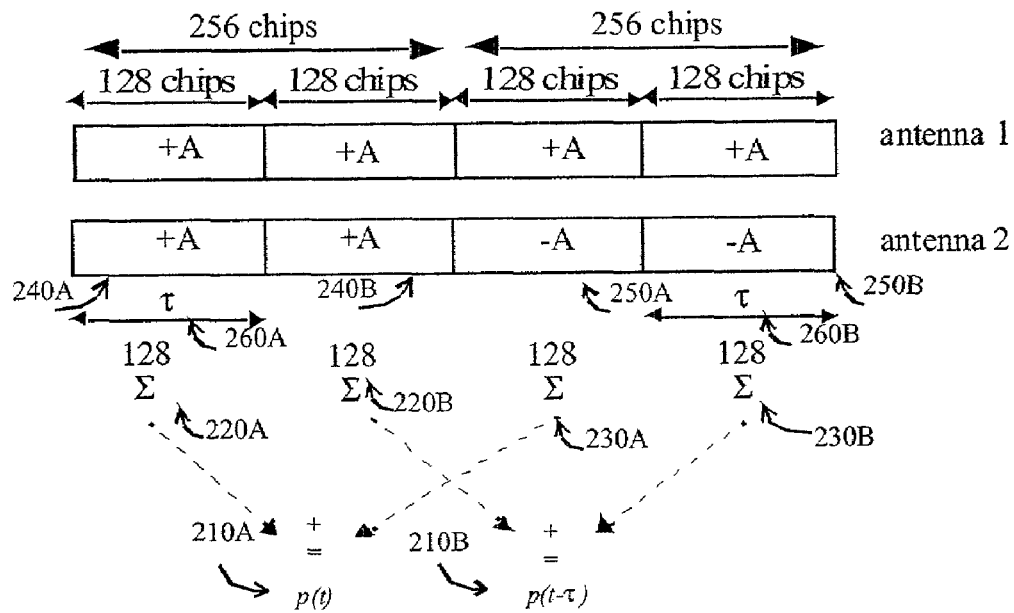
FIG. 10 is a block diagram that illustrates one embodiment of the method of operating the FD in an AFC at UE.
Figure 11:
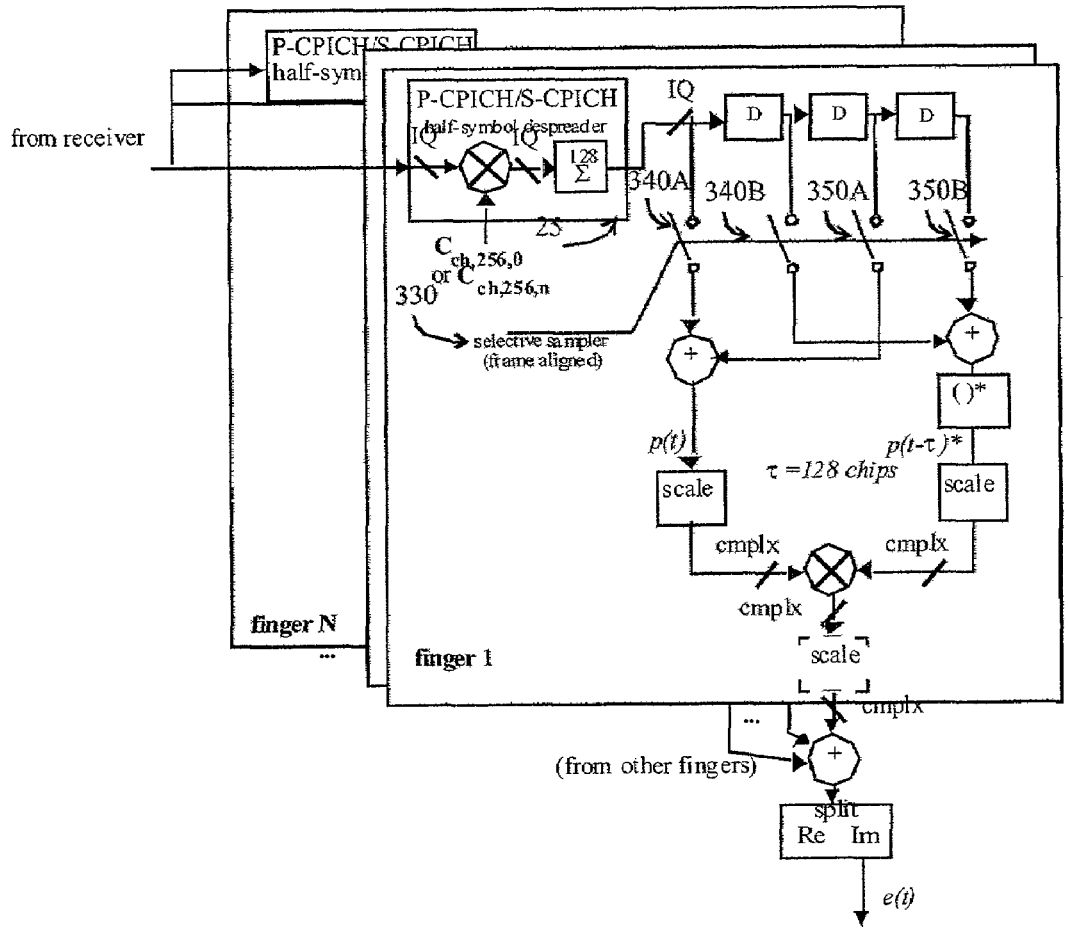
FIG. 11 is a block diagram that illustrates one embodiment of the FD apparatus operated on by the method of FIG. 10.
Figure 12:
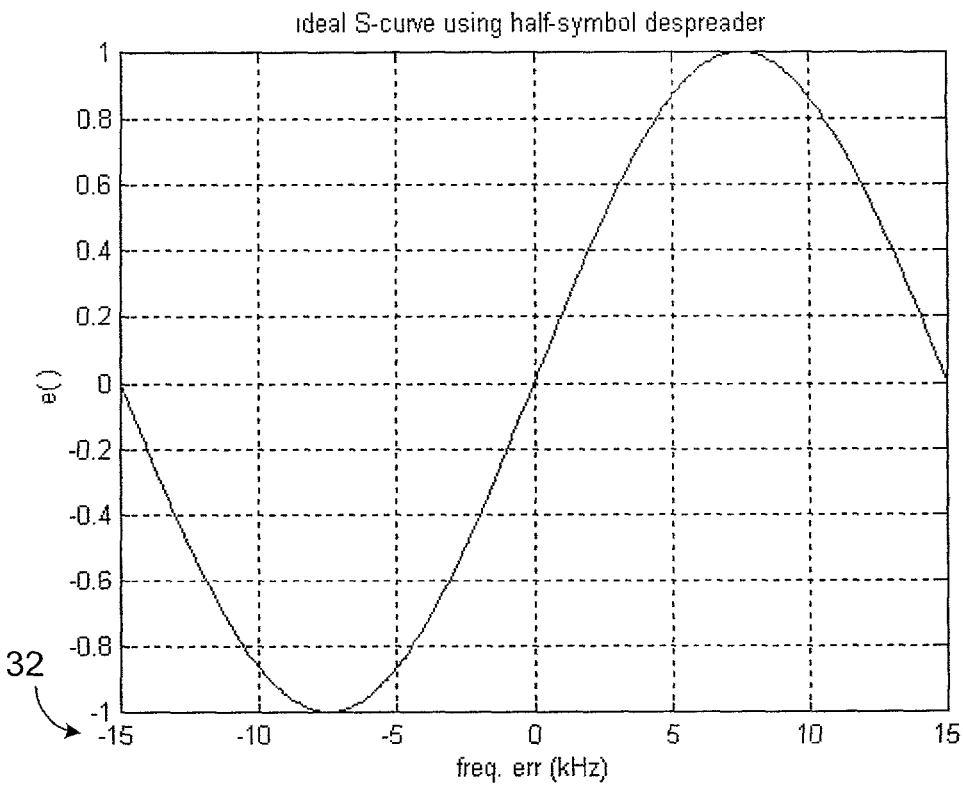
FIG. 12 illustrates an S-curve for the error signal provided by the method and apparatus of FIGS. 10 and 11.

To increase the detection range further, a third embodiment will be described in reference to FIGS. 10-12. The third embodiment uses a special spreader 25 that splits the 256-chip pilot symbols into two half symbols of 128 chip, so that the first interval 240 and second interval 250 are half a symbol, or 128 chip, long. The selective sampler 330 samples only during intervals in which the first tap 340A and second tap 340B contain half symbols in which the antenna 2 components are opposite in sign to those in respective third tap 350A and fourth tap 350B. The sampler 330 is restricted to sampling in these intervals, but is not required to sample at all these intervals. It should be noted that the method and system for this embodiment are the same as the previous embodiments, save for the smaller symbol size. This refinement can be employed in the apparatus and method of either the first or second embodiments.

Having taught how to eliminate the antenna 2 interference component with respect to antenna 1 for the purposes of AFC operation, an improvement applicable to all of the aforementioned embodiments will now be presented. The improvement makes it possible to independently eliminate the antenna 1 interference component with respect to antenna 2, thereby providing a second frequency error signal. The two frequency error signals can then combined to provide a third error signal thereby making use of the diversity gain provided by an STTD signal.

With some additional steps and apparatus, to be described below in reference to FIGS. 13-14, it is possible to eliminate the antenna 1 component in a manner analogous to how the antenna 2 component was eliminated as described in the above embodiments. What will be described applies equally well to any of the three embodiments described above, but for the sake of brevity will only be described in reference to the first embodiment, as adaptation to the other two would be obvious to a person skilled in the art.

Figure 13:
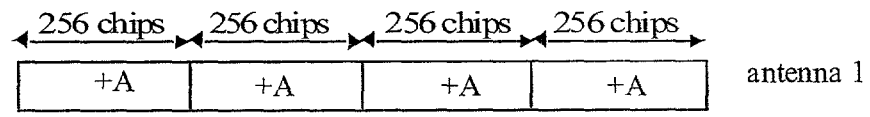
FIG. 13 is a block diagram that illustrates one embodiment of additional steps in the method of operating the FD in an AFC at UE.
Figure 13:
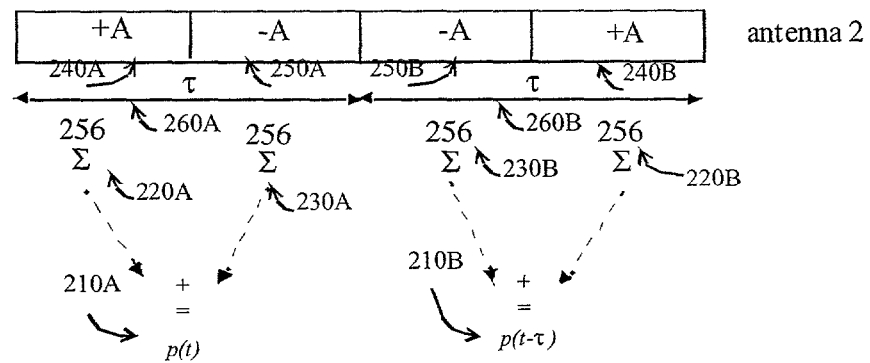
Figure 13:
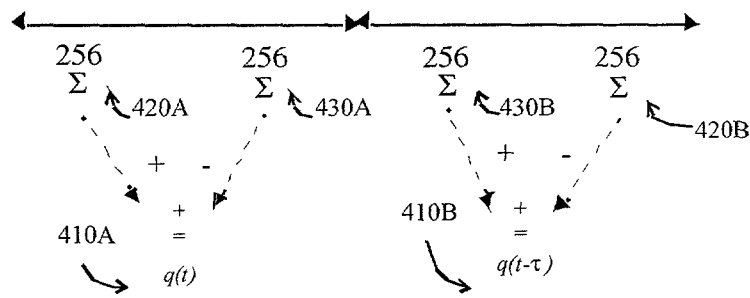

As compared to the method of FIG. 4, the method of FIG. 13 provides additional steps to eliminate the antenna 1 component, which can be used in conjunction with previous methods, or on its own as a separate error determining method. Partial sums are taken in each of the first and second intervals as in previous embodiments. Where previous embodiments had summed the partial sums to eliminate the second sequence, this embodiment takes the additive inverse of the second partial sum, so as to eliminate the first sequence. This can be implemented using either subtractors, or a negator, designed to negate a partial sum by multiplying by −1, in series with an adder. The total sum of the first partial sum and the negated second partial sum is q(t) 410A. In an analogous manner, the delayed signal q(t–τ) 410B is provided. The delay between signal q(t) 410A and q(t–τ) 410B is τ 260.

By providing total difference 410 in the invention, statistically the antenna 1 component in the first interval 240 cancels the antenna 1 component in the second interval 250 thereby the antenna 1 component that would have traditionally interfered with the antenna 2 component in FD 20 operation is eliminated by the invention.

Figure 14:
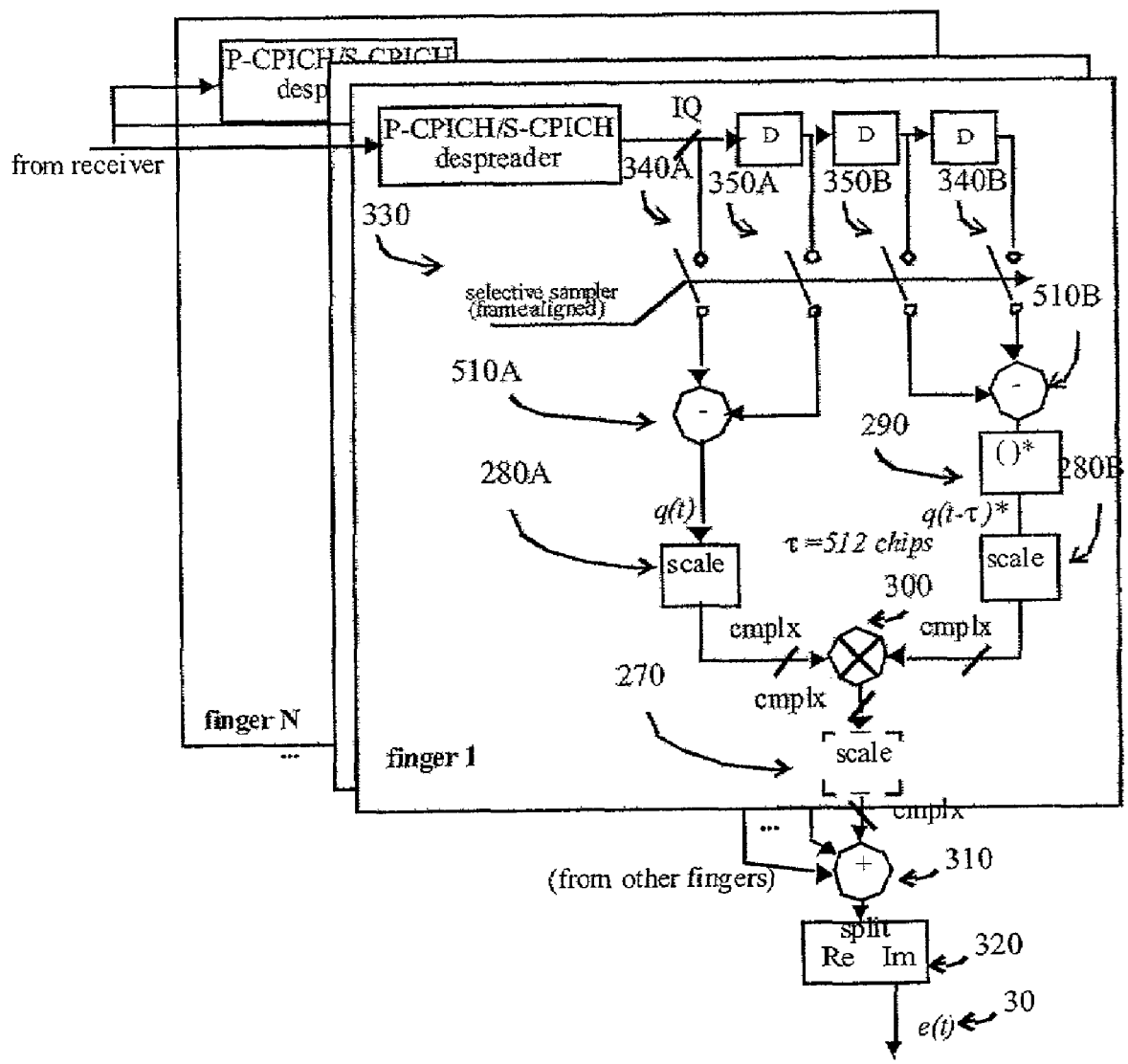
FIG. 14 is a block diagram that illustrates one embodiment of the additional FD apparatus operated on by the method of FIG. 13.

An apparatus adapted to allow the additional steps of eliminating the antenna 1 components is illustrated in FIG. 14. The apparatus positively sets out the additional hardware required to independently eliminate the antenna 1 component, and although not expressly shown in the drawing is meant to be operated in conjunction with apparatus that independently eliminates the antenna 2 component. Instead of using a first adder 210A and a second adder 210B as was the case for eliminating antenna 2 components, the apparatus for eliminating antenna 1 components uses a first subtractor 510A and a second subtractor 510B, or as described above, it can use a negator on one of the partial sums prior to adding to obtain an additive inverse. By using systems that independently eliminate the interference caused by the first and second sequences it is possible to create a third error signal.

Hence while the summation for p(t) 210A and p(t–τ) 210B eliminates the signal from antenna 2 (assuming infinite channel coherence time), q(t) 410A and q(t–τ) 410B eliminates the signal from antenna 1. Both correlation products p(t)p*(t–τ) and q(t)q*(t–τ) are proportional to the magnitude of the carrier-to-interference ratio (CIR) squared and sin (wt). Hence we can just add these together forming an error signal for the AFC loop of $$e(t) = \frac{\text{Im}(p(t)p^*(t-\tau) + q(t)q^*(t-\tau))}{|p(t)p^*(t-\tau)| + |q(t)q^*(t-\tau)|}.$$

To further illustrate this, let g be the complex channel gain from antenna 1 to the receiver and let b be the gain from antenna 2. Assume that b and g are constant for the moment. Then we have
$$\begin{aligned} p(t) &= 2gA(t)e^{jwt} \\ q(t) &= 2bA(t)e^{jwt}, \end{aligned}$$

where "w" is the frequency error. Hence $$p(t)p^*(t-\tau) = 4|g|^2 A(t)A^*(t-\tau)e^{jwt}$$
$$q(t)q^*(t-\tau) = 4|b|^2 A(t)A^*(t-\tau)e^{jwt}$$

since $A(t)=A(t-\tau)$ assuming appropriate despreading, then $A(t)A^*(t-\tau)=1$ and we have $e(t)=\sin(wt)$ This is the same error signal as in the earlier embodiments. However, a limitation of the previous embodiments is that if the propagation path from the second RNS antenna to the UE is severed then no error signal for frequency tracking is available. With the improvement outlined above, the error signal is always available to the UE unless both first and second antenna propagation paths from the RNS to the UE are severed, which would result in the loss of all symbols, rendering the loss of frequency error estimates meaningless.

As another enhancement to the above embodiments e(t) can be multiplied by the average signal to noise ratio of the pilot signal, which results in a well controlled error signal. Hence, the AFC will have the properties of a first order Kalman filter that compensates the frequency control strongly when SNR is high and weakly when the SNR is low.

The embodiments of the above-described invention provide three frequency error estimates that allow a STTD signal to be tracked in an AFC. The first set of embodiments uses the properties of the second sequence to remove interference that the second sequence causes in the first sequence, and provides a frequency error estimate based on the first sequence. The second set of embodiments uses the properties of the first sequence to remove interference that the first sequence causes in the second sequence, and provides a frequency error estimate based on the second sequence. A third frequency error estimate is provided through the summation of the two previous error estimates, and provides a greater range of frequency error control than either of the first two independently. Additionally, in operation the third error estimate provides additional robustness, by maintaining an frequency error calculation in the event of one transmitting antenna failing. This allows for a level of redundancy due to the dual sequences transmitted by STTD antennae.

The above-described embodiments of the present invention are intended to be examples only. Those of skill in the art may effect alterations, modifications and variations to the particular embodiments without departing from the scope of the invention, which is defined solely by the claims appended hereto.

We claim:

1. An apparatus having a frequency discriminator for obtaining a frequency error estimate of the difference between a reference frequency and the frequency of a space time transmit diversity signal from first and second received sequences transmitted respectively by first and second antennae, and received by a receiving antenna, where each sequence has two sets of first and second intervals, of equal length, such that the contents of the second interval of the second received sequence are the additive inverse of the contents of the first interval of the second received sequence, the frequency discriminator comprising:
    a memory, operatively attached to the receiving antenna for storing the contents of the first and second sequences;
    interval defining means, operatively attached to the memory to receive the first and second sequences of symbols, for dividing the received sequences into sets of first and second intervals;
    partial sum adding means, operatively attached to the interval defining means to receive the contents of first and second sequences during the two sets of first and second intervals, for calculating two sets of first and second partial sums as the sum of the contents of the first and second intervals respectively for each set;
    total sum adding means, operatively attached to the partial sum adding means to receive the two sets of first and second partial sums, the total sum adding means for calculating total sum functions for the first and second sets representing the sum of the first and second partial sums for each set;
    conjugation means, operatively attached to the total sum adding means to receive the total sum of the second set of partial sums, for calculating the conjugate of the total sum;
    multiplier means, operatively attached to the conjugation means and total sum adding means to receive the total sum functions and the conjugate of the received total sum for multiplying the received total sum functions and the conjugate of the received total sum thereby providing a correlation function; and
    a frequency error estimator, operatively attached to the multiplier means to receive the correlation function, for extracting the frequency error from the correlation function.

2. The apparatus of claim 1, further comprising scaling means, operatively attached to the total sum adding means to receive the total sum of the first set of partial sums and to the conjugation means to receive the conjugate of the total sum of the second set of partial sums, for scaling the received total sums.

3. The apparatus of claim 1, further comprising multiple frequency discriminators sharing a single frequency estimator, and diversity combining means, operatively attached to the multiplier means of each frequency discriminator to receive the multiplied total sums, for combining the received multiplied total sums to provide a diverse correlation function used as the correlation function by the single shared frequency error estimator.

4. The apparatus of claim 1, further comprising scaling means, operatively attached to the multiplier means to receive the output of the multiplier means, for scaling the correlation function.

5. The apparatus of claim 1, wherein the interval defining means is a set of samplers.

6. The apparatus of claim 1, further comprising a selective sampler connecting the partial sum adding means and the total sum adding means for selectively providing the total sum adding means with the partial sum adding means.

7. The apparatus of claim 1, wherein the scaling means includes means for dividing each total sum by its magnitude.

8. The apparatus of claim 1, wherein the scaling means includes an ideal scaler.

9. The apparatus of claim 1, wherein the scaling means includes a signal to noise ratio scaler.

10. The apparatus of claim 1, further comprising a second scaling means, connecting the multiplier means to the diversity combining means, to receive the multiplied total sums, for scaling the received multiplied total sums, and providing the scaled multiplied total sums to the diversity combining means.

11. The apparatus of claim 1, wherein the frequency error estimator includes a splitter for separating the real and imaginary component of the correlation function for providing the imaginary component of the correlation function as the frequency error.

12. The apparatus of claim 1, wherein the interval defining means includes means for providing the partial sum adding means with symbols from adjacent first and second intervals in the same set.

13. The apparatus of claim 1, wherein the interval defining means includes means for providing the partial sum adding means with symbols from interleaved sets of first and second intervals.

14. The apparatus of claim 1, wherein the interval defining means includes means for providing intervals one symbol in length.

15. The apparatus of claim 1, wherein the interval defining means includes means for providing intervals that are a half symbol in length.

16. The apparatus of claim 1, further comprising a negator, connecting the partial sum adding means to the total sum adding means, for receiving the second partial sum of each set from the partial sum adding means, multiplying the second partial sum of each set by −1, and for providing the negated second partial sum to the total sum adding means.

17. The apparatus of claim 1, further comprising:
a negator, connecting the partial sum adding means to a second total sum adding means, for receiving the second partial sum of each set from the partial sum adding means, for negating the second partial sum of each set by multiplying the second partial sum by −1; and
a second total sum adding means, operatively attached to the partial sum adding means to receive the first partial sum of each set and to the negator for receiving the negated second partial sum for each set, for calculating second total sum functions for the first and second sets representing the sum of the first partial sum and the negated second partial sum of each set, and for providing the conjugation means with the second total sum of the second set for conjugation.

18. The apparatus of claim 17, wherein the frequency error estimator is operatively connected to the diversity combining means to receive two correlation functions corresponding to the output of the first and second total sum adding means, for providing the sum of the two correlation functions as the frequency error.

19. The apparatus of claim 1, further comprising:
a loop filter, operatively attached to the frequency discriminator to receive the frequency error, for generating an oscillator control signal based on the frequency error to minimize the difference between the reference frequency and the frequency of the space time transmit diversity signal; and
a controlled oscillator, operatively attached to the loop filter to receive the oscillator control signal, for generating the reference frequency based on the oscillator control signal.

20. The apparatus of claim 19, wherein the controlled oscillator is a numerically controlled oscillator.

21. The apparatus of claim 19, wherein the controlled oscillator is a voltage-controlled oscillator.

* * * * *